United States Patent [19]

Davis et al.

[11] Patent Number: 4,952,534

[45] Date of Patent: Aug. 28, 1990

[54] SPRAYABLE PLASTIC REFRACTORY

[75] Inventors: Allen R. Davis; Elbert A. Willis, both of Mexico, Mo.

[73] Assignee: A. P. Green Industries, Inc., Mexico, Mo.

[21] Appl. No.: 285,087

[22] Filed: Dec. 15, 1988

Related U.S. Application Data

[60] Division of Ser. No. 120,187, Nov. 9, 1987, Pat. No. 4,810,537, which is a continuation of Ser. No. 933,264, Nov. 20, 1986, abandoned, which is a continuation-in-part of Ser. No. 910,059, Sep. 22, 1986, abandoned.

[51] Int. Cl.[5] ........................ C04B 35/66; C04B 35/68

[52] U.S. Cl. ........................................ 501/94; 106/687

[58] Field of Search ...................... 501/81, 82, 89, 124, 501/38, 94; 106/99, 108, 38.23, 197.1; 427/196, 422

[56] References Cited

U.S. PATENT DOCUMENTS 4,514,531 4/1985 Kleeb et al. ........................... 501/82

*Primary Examiner*—William R. Dixon, Jr.

*Assistant Examiner*—Alan A. Wright

*Attorney, Agent, or Firm*—Senniger, Powers, Leavitt and Roede

[57] ABSTRACT

A gunnable plastic refractory is made by adding a hydrocolloid, for example a polysaccharide ether such as methylcellulose, to the refractory composition and adjusting the moisture content to be from about 4% to about 10%. The workability index of the refractory mix is from about 8% to about 30%. The refractory can be gunned without stoppages caused by clogging of hoses and the rebound rate is low.

10 Claims, No Drawings

SPRAYABLE PLASTIC REFRACTORY

CROSS REFERENCE TO RELATED APPLICATIONS

This application is a division of co-pending application Serial No. 120,187, filed Nov. 9, 1987, U.S. Pat. No. 4,810,537 which is a continuation of application Ser. No. 933,264, filed Nov. 20, 1986, now abandoned, which is a continuation-in-part of application Ser. No. 910,059, filed Sept. 22, 1986 now abandoned.

BACKGROUND OF THE INVENTION

This invention relates to a plastic refractory especially suitable for pneumatic gunning. It relates more specifically to a plastic refractorY which may be gunned more efficiently because less rebound occurs and because the flow of the granulated refractory through the gunning apparatus is improved.

A plastic refractory is a moist, pliable mixture of aggregates and binders which when applied to a furnace wall or the like and fired in place forms a hard, monolithic, refractory lining for the substrate. Plastic refractory compositions are manufactured in granular form and in slab form. Both forms have been and still are placed by ramming the plastic masses onto the substrate to knead and knit them together and form a monolithic lining. Ramming is labor intensive and much care must be taken to avoid lamination of the plastic masses which would shorten the useful life of the refractory lining.

The gunning of plastic refractories has the advantages of being potentially less labor intensive and of forming non-laminar linings. The potential for savings in labor costs is reduced in some circumstances by the large amounts of refractory material that rebounds from the surface being covered. Also, the larger pieces of aggregate may be lost by rebound while the smaller ones remain, resulting in the emplacement of a refractory widely different in composition than the starting material. In some cases the rebounded material can be recovered and reworked into a pliable mass but in others it is not usable because of contamination. In either circumstance, time is lost in recovering the rebound and in gunning for a longer period to build up the desired thickness. Moreover, the very nature of the plastic refractory makes it susceptible to compaction during storage and even during shipment. Thus, a plastic refractory which has been granulated for application by the gunning technique may not be in gunnable condition at the site because of compaction. Also, attempts to minimize the amount of rebound by increasing the amount of water in the refractory mixture have often had the undesirable effect of causing the mixture to cling to the internal surfaces of the delivery hoses and pumps and eventually clog the apparatus, thereby causing work stoppages. Adding the water as a separate stream into a dry refractory mix as it passes through the gun nozzle calls for a considerable amount of skill to maintain the proper plasticity so that rebound is minimized and laminations are avoided.

Greener teaches in U.S. Pat. No. 4,535,001 that conventional plastic refractory materials can be gunned without the need to add water or modify the composition by the simple expedient of gunning the refractory material immediately after the granulation thereof. To do so requires that special equipment such as the granulator and conveyor taught by Greener must be at the job site. The cost of building, maintaining, and transporting such equipment may offset the advantage of being able to use conventional ramming-type plastic refractory material instead of specially formulated materials.

Summary of the Invention

It is an object of this invention, therefore, to provide a specially formulated plastic refractory material which may be gunned easily in a moist, granular form.

It is another object of this invention to provide a moist friable plastic refractory material which may be gunned with a minimal amount of rebound.

It is another object of this invention to provide a refractory lining having no laminations and an extended service life.

The improved plastic refractorY composition of this invention is a mass of friable clusters of granular material which has a moisture content of from about 4% to about 10% by weight of the total composition and contains from about 0.05% to about 0.2% by weight of a hydrocolloid selected from the class consisting of a polysaccharide ether and xanthan gum. The ether is exemplified by methylcellulose, carboxymethylcellulose, and hydroxypropylcelluose. Xanthan gum is a very high molecular weight branched polysaccharide produced by a bacterial fermentation of glucose. It is available under the trademark KELZAN from the Kelco Division of Merck & Co., Inc. The workability response to moisture content in a particular refractory composition varies according to the mix of clays, alumina, other oxide minerals, and binders therein but the workability of the compositions of this invention may be from about 8% to about 30% as measured by ASTM Standard Method C-181-47.

Detailed Description

Alumina is often the major constituent of the total composition; it may be calcined alumina, tabular alumina, bauxite, kaolin or mixtures thereof. An aluminum silicate such as kyanite or mullite may also be present. Plastic clays and ball clays and small amounts of bentonite are sometimes used. For special purposes, the composition may contain oxide minerals such as chromic oxide, titania, iron oxide, silica, and alkaline earth metal oxides.

The gunnable refractory compositions of this invention may be formulated to be of the heat-set, air-set, or the chemical bonding type. The heat-set compositions form a bond when placed and heated to about 900-1000° F. Air-set plastics contain aluminum sulfate which forms a crust as the refractory dries. The chemical bonding type contains phosphoric acid or an acid phosphate which reacts with the alumina in the composition.

Ordinarily, a gunnable plastic refractory must be drier than a granular ramming plastic in order to avoid clogging of the gun, hose and nozzle. The drier mix is less sticky and doesn't adhere readily to the inner walls of the gunning equipment but by the same token it doesn't adhere well to the wall being gunned. The addition of methYlcellulose or one of the other hydrocolloids described herein to such drier gunnable refractories not only improves the plasticitY of the granular mass so as to reduce rebound when it is spraYed but it greatly improves the flow of the material from the gun to the nozzle. Not only is the rebound of the drier mix reduced but the mix may be made wetter than usual and still be gunned without stoppages. Needless to say, the wetter mix rebounds even less.

Because it is the larger particles which constitute the major portion of the rebounded material in any gunning operation, wet or dry, the loss of these particles means that the resulting refractory lining will have an undesirable proportion of fines and binders. Such a lining will have a shortened service life. Thus, one of the advantages of this invention related to the lesser rate of rebound is a gunned refractory lining having a long service life.

The particle size distribution among the mineral solids of the refractory composition of this invention is such that all are finer than 3 mesh (Tyler No. 3) and at least about 45% are finer than 65 mesh as determined by a wet screen analysis of the clustered granular material. The moisture that is added comes from water, a lignin liquor such as glutrin (sodium aluminum lignosulfonate), and phosphoric acid in the case of the chemically bonded refractories of this invention.

A Reed gun is satisfactory but it is preferred to use the BSM gun manufactured by Beton Spritz Maschinen Gmbh of Frankfurt, West Germany and sold in the United States by the A. P. Green Refractories Co. Large clusters of the granular refractory material may be broken up easily by hand on a grid spanning the hopper of the gun. It is more convenient, however, to employ a gridwork having upwardly projecting fingers and a sweep having a vertical axle in common with the gun. Rotation of the sweep pushes the clusters into and between the fingers. The sweep may be a series of bars which pass between the fingers or a flexible blade which rides over the fingers. The air pressure used in the gunning of heat-set and air-set refractories is from about 50 to about 70 psi but it is from about 80 to about 85 psi when the "phos-bonded" refractories are being gunned.

The invention is further illustrated by the following examples.

EXAMPLE 1

Calcined kaolin containing 52.5% by weight alumina, a plastic clay, ball clay, kyanite, aluminum sulfate, glutrin, methylcellulose, and water were mixed to form a granular gunning refractory mix having a workability index of 19.7%. The moisture content was 8.8% by weight and the mixture contained 0.18% methylcellulose by weight. A good flow of material was observed during gunning of this refractory at 65-70 psi. Rebound of the material was about 18.1% by weight.

EXAMPLE 2

A mixture of tabular alumina, calcined alumina, kyanite, chromic oxide, phosphoric acid, monoaluminum phosphate, bentonite, boric acid, and methylcellulose was formed and then sufficient water was added to obtain a granular gunning refractory mix containing 0.13% methylcellulose by weight and having a workability index of 21.3%. The moisture content was 5.1% by weight and the alumina constituted 72.1% by weight of the refractory mix. This material gunned very well through a BSM GL-404 gun. The bulk densitY of the gunned refractory was 180.6 pounds per cubic foot as installed and 170.1 pounds per cubic foot after being heated to 1500° F. The rebound rate was less than 5% by weight during several gunnings of mixes made according to this example.

EXAMPLE 3

A refractory mix similar to that of Example 2 but containing no aluminum phosphate and having an alumina content of 65.1% by weight was prepared to have a workability index of 22.6% and a moisture content of 7.5% by weight. It contained 0.18% methylcellulose by weight and gunned at a rate of about 10,000 pounds per hour through a Reed gun. The density of the refractory lining thus installed was 183.3 pounds per cubic foot before firing. The rate of rebound was less than 11% by weight.

EXAMPLE 4

A refractory mix similar to that of Example 2 but containing 0.15% by weight of xanthan gum (KELZAN S) instead of the methylcellulose had a workability index of 17.0% and a moisture content of 5.5% by weight as made. After storage for 19 days the workability index was 8.7% and the moisture content was 4.2% by weight but the material gunned very well with no flowability problems and no hose plugging. The rebound rate was 24.4% by weight which is rather surprisingly low in view of the low workability and moisture content of the stored material.

WHAT IS CLAIMED IS:

1. A gunnable plastic refractory composition having a workability index of from about 8% to about 30% and containing from about 0.05% to about 0.2% by weight of a hydrocolloid selected from the group consisting of xanthan gum and an ether of a polysaccharide.

2. A composition of claim 1 characterized further in that it comprises friable clusters of granular material.

3. A composition of claim 1 wherein the hydrocolloid is an ether of a polysaccharide.

4. A composition of claim 3 wherein the ether is methylcellulose.

5. A composition of claim 1 wherein the hydrocolloid is xanthan gum.

6. A composition of claim 1 wherein the major constituent of the refractory composition is alumina.

7. A composition of claim 6 wherein the hydrocolloid is methylcellulose.

8. A composition of claim 6 wherein the hydrocolloid is xanthan gum.

9. A composition of claim 6 wherein the refractory composition contains a phosphate selected from phosphoric acid and an acid phosphate.

10. A composition of claim 9 wherein the hydrocolloid is methylcellulose.

* * * * *